United States Patent [19]

Seitz et al.

[11] Patent Number: 4,982,827
[45] Date of Patent: Jan. 8, 1991

[54] WORKPIECE PROCESSING SYSTEM

[75] Inventors: David R. Seitz, Vandalia; Hyman B. Finegold, Dayton; Mark T. Heaton, Springfield, all of Ohio

[73] Assignee: Globe Products Inc., Dayton, Ohio

[21] Appl. No.: 303,064

[22] Filed: Jan. 30, 1989

Related U.S. Application Data

[63] Continuation of Ser. No. 718,164, Apr. 1, 1985, abandoned.

[51] Int. Cl.⁵ ............................................. B65G 43/00
[52] U.S. Cl. ............................... 198/341; 198/349.8
[58] Field of Search ............. 198/339.1, 340, 341, 198/346.1, 346.2, 370, 349, 349.1, 349.6, 349.8, 349.95, 803.14, 803.15, 463.3, 349.7, 349.9; 414/222, 231, 232

[56] References Cited

U.S. PATENT DOCUMENTS

| Re. 31,945 | 7/1985 | Magni . | |
|---|---|---|---|
| 2,884,113 | 4/1959 | Converse, III et al. . | |
| 3,165,192 | 1/1965 | Wallis | 198/345 |
| 3,213,997 | 10/1965 | Fryer | 198/345 X |
| 3,530,571 | 9/1970 | Perry . | |
| 3,549,644 | 10/1985 | Bowles et al. | 198/341 |
| 3,726,383 | 4/1973 | Bornfleth et al. . | |
| 3,854,889 | 12/1974 | Lemelson | 198/341 X |
| 4,149,620 | 4/1979 | Rosensweig | 198/345 |
| 4,306,646 | 12/1981 | Magni | 198/341 |
| 4,553,321 | 11/1985 | Zihlmann et al. | 198/341 X |
| 4,564,102 | 1/1986 | Mori et al. | 198/341 |

OTHER PUBLICATIONS

Advertisement "DAW-300", by Axis S.p.A.

*Primary Examiner*—H. Grant Skaggs
*Assistant Examiner*—D. Glenn Dayoan
*Attorney, Agent, or Firm*—Roger S. Dybvig

[57] ABSTRACT

Workpieces are conveyed from an incoming load station to a plurality of processing machines utilizing an endless conveyor having plural cradles for carrying the workpieces. A seat memory tracks each of the cradles and designates them as either work-to-be-performed cradles or work-finished cradles. The cradles are filled at a load station in accordance with an algorithm by which there is a predetermined ratio between those of the cradles being conveyed from the load station to the first of the processing machines designated as work-to-be-performed cradles and those of the cradles designated as work-finished cradles.

20 Claims, 8 Drawing Sheets

WORKPIECE PROCESSING SYSTEM

This is a continuation of application Ser. No. 06/718,164, filed Apr. 1, 1985, now abandoned

SUMMARY OF THE INVENTION

This invention relates to a workpiece processing system and particularly to a processing system having a conveyor for conveying workpieces to and from a plurality of processing stations. The invention is especially adapted for use with processing systems wherein there are plural processing machines performing substantially the same operations, so that each workpiece is only treated by one processing machine, but those familiar with the art will recognize that the invention may be useful in various other processing systems.

An object of this invention is to provide an improved workpiece processing system utilizing an endless conveyor for conveying workpieces to and from a plurality of processing machines. More particularly, it is an object of this invention to minimize the "through-put" time required for workpieces to be treated by processing machines.

Because of the need for mass-production of workpieces in many industries, it has become common practice to install several processing machines, each of which may perform the same processing operations, and to convey the workpieces to the machines by using a single endless conveyor passing adjacent the processing machines. Processing machine cycle times normally vary from machine-to-machine so that different machines in a line will require load and unload operations at different times. Also, there is a need to stop the conveyor for loading and unloading of the workpieces on and off the conveyor. Therefore, to keep all of the machines operating with peak efficiency can become a substantial problem. It is not uncommon to find that an increase from, say, three processing machines to four processing machines will result in very little increased production because one or more of the four machines is idle a substantial percentage of the time due to the inability of the conveyor system to deliver and remove workpieces fast enough to meet the demands of the several machines. Still another object of this invention is to provide a conveyor system for conveying workpieces to plural processing machines with considerable efficiency. A further object is to provide such a system that is capable of efficiently storing both processed and unprocessed workpieces.

In accordance with this invention, workpieces are conveyed from an incoming load station to a plurality of processing machines utilizing an endless conveyor having plural workpiece carriers passing adjacent the processing stations. A carrier seat memory tracks each of the carriers and designates them as either work-to-be-performed carriers or work-finished carriers. The memory receives a signal to designate a carrier as work-to-be-performed carrier when it is filled by at least one workpiece at an incoming load station and receives another signal to designate a carrier as a work-finished carrier when it is emptied at a processing station. The carrier retains its designation in memory as a work-finished carrier until it is again filled at the incoming load station. Here it may be noted that a carrier, once designated as a work-finished carrier by being emptied at a processing station, will either remain empty or, if filled at a processing station, will normally be emptied at a conveyor outgoing unload station. Accordingly, a carrier designated as a work-finished carrier will usually be empty when it arrives at the conveyor incoming load station so that it can be filled by a fresh workpiece.

Further in accordance with this invention, a limitation is placed upon the number of carriers filled at the incoming load station with workpieces upon which work is to be performed. This is accomplished by use of an algorithm by which there is a predetermined ratio between those of the carriers being conveyed from the incoming load station to the first of the processing stations designated as work-to-be-performed carriers and those of the carriers designated as work-finished carriers.

Of the carriers being conveyed from the incoming load station to the first of the processing stations, there should ordinarily be more carriers designated as work-to-be-performed carriers than those that are designated as work-finished carriers, so that an abundance of workpieces will be available for supplying the processing machines with workpieces requiring processing. However, it will usually be necessary that there will be at least some carriers designated in the memory as work finished carriers, because these will primarily be empty carriers which are needed so that processed workpieces may be returned to the conveyor from the processing machines without undue delay. Accordingly, in most cases, an algorithm is so selected that there are more of the carriers being conveyed from the load station to the first of the processing stations designated as work-to-be-performed carriers than work-finished carriers.

Preferably, the algorithm is based upon the designations in the memory of the carrier at the load station and of selected ones of the carriers adjacent the load station as either "work-to-be-performed" or "work-finished". As an example, one algorithm that has proved satisfactory for an armature winding line employing four armature winding machines operates so that a armature to be wound is loaded into an empty carrier at the incoming load station when, and only when, the memory designates at least one of the two carriers past the incoming load station as a work-finished carrier and the carrier behind the incoming load station as a work-finished carrier. Of course, other algorithms will be useful in other circumstances.

Other objects and advantages will become apparent from the following description and the drawings.

DETAILED DESCRIPTION OF THE PREFERRED EMBODIMENT

Figure 1:
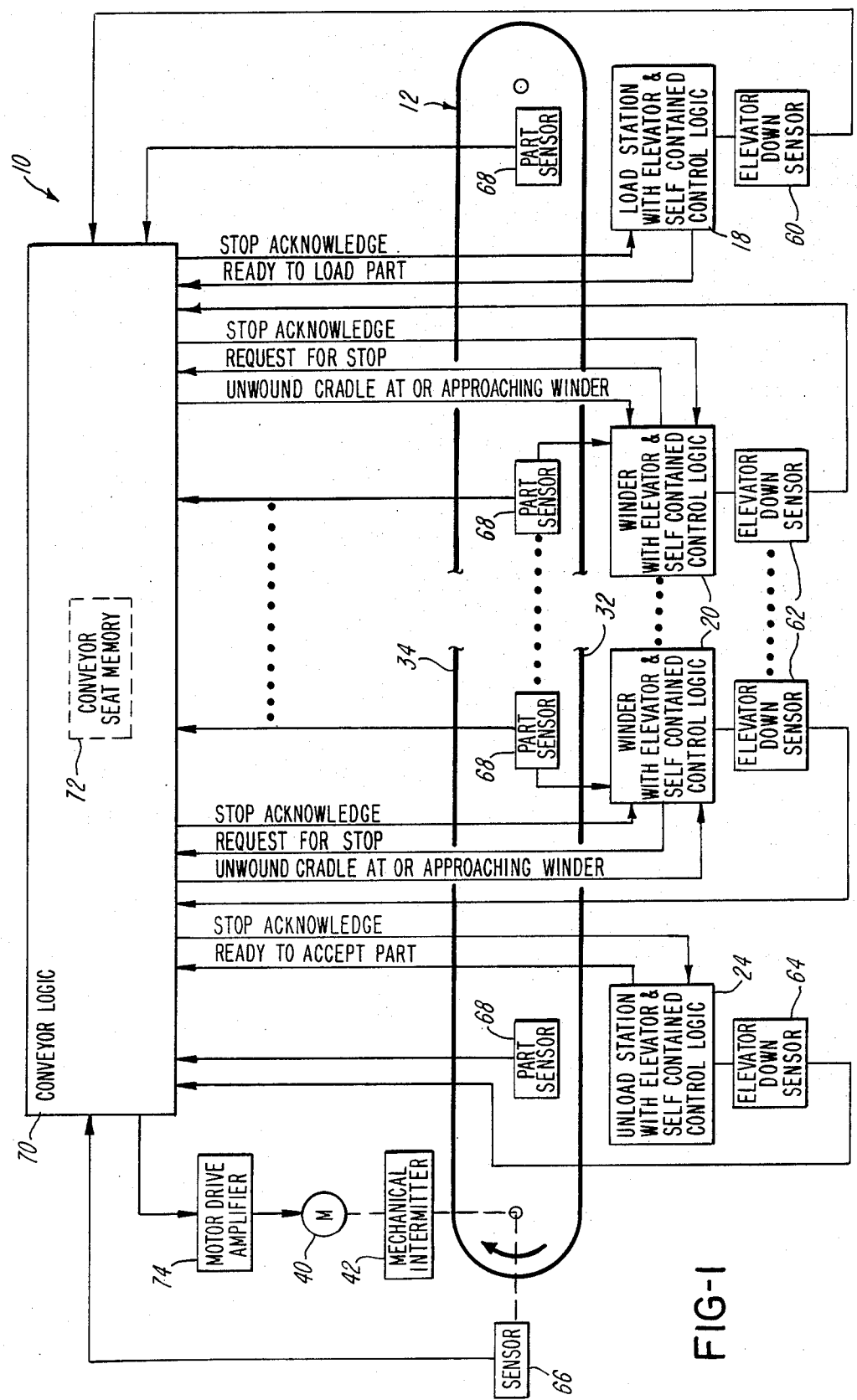
FIG. 1 is a diagrammatic and schematic view of a workpiece processing system in accordance with this invention.
Figure 2:
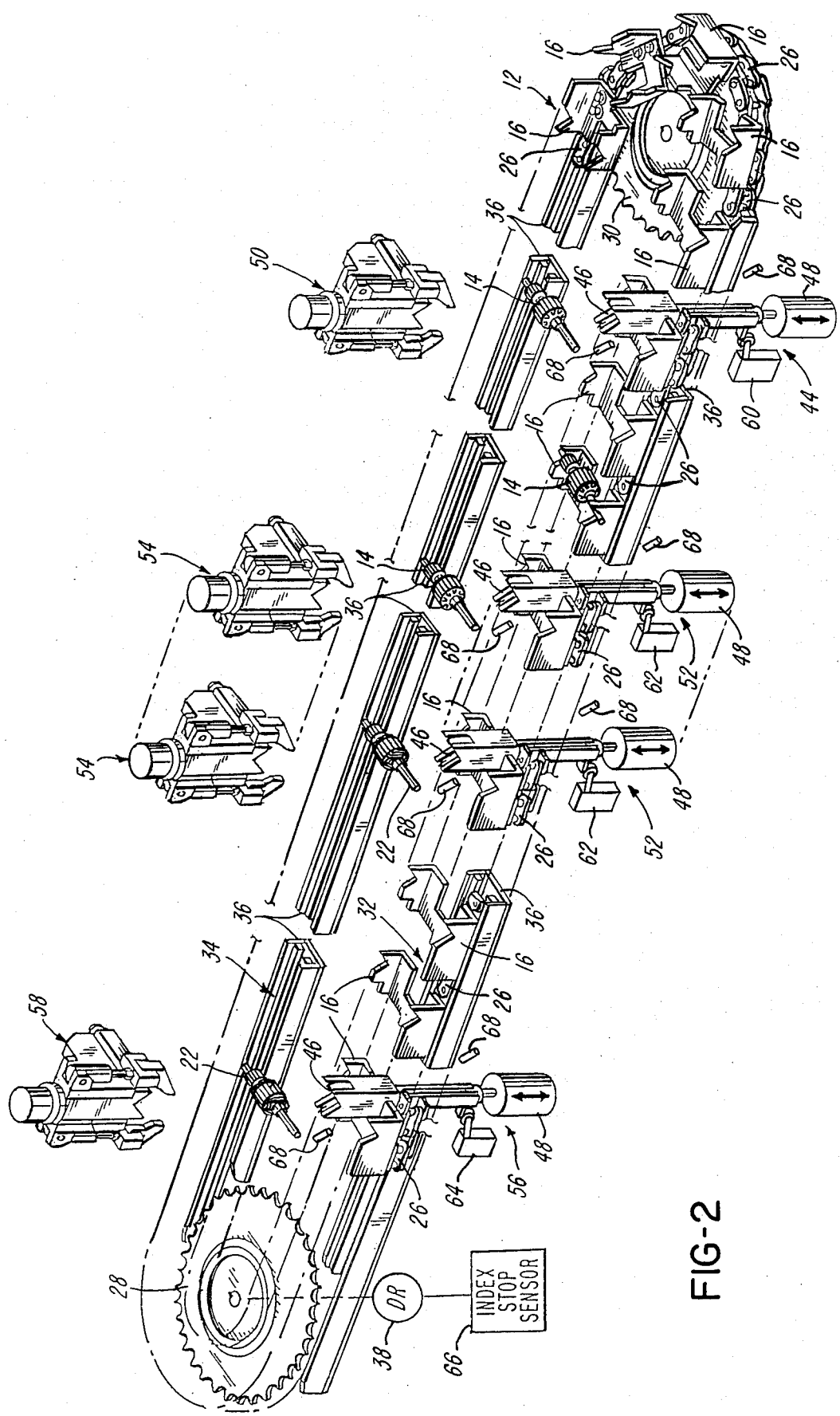
FIG. 2 is a highly simplified perspective view with parts broken away of a conveyor and associated components of a type that may be used in the processing system of FIG. 1.

With reference to FIGS. 1 and 2 this invention is illustrated and described herein in connection with an armature winding line for winding armatures for small electric motors. As will become apparent, this invention may also be used for manufacturing or processing of a wide variety of workpieces. The workpiece processing system is generally designated 10 and includes an endless loop conveyor 12 by which unwound armature cores 14 deposited on conveyor armature carriers or cradles 16 at a conveyor incoming load station 18 are conveyed to plural armature winding machines 20 and wound armature cores 22 are conveyed from the armature winding machines to a conveyor outgoing unload station 24 at which the wound armature cores 22 are removed from the conveyor 12.

The particular conveyor 12, as illustrated in simplified fashion in FIG. 2, comprises an endless, conventional link chain 26 extending around a pair of sprockets 28 and 30 between which it is guided along a pair of parallel, straight line paths 32 and 34 by a pair of generally U-shaped rail structures 36. The armature carriers 16 are equally spaced along the lengths of the straight line paths 32 and 34 and the conveyor 12 is driven in step-wise fashion by an intermittant drive 38 which as diagrammatically illustrated in FIG. 1 include a drive motor 40 and a mechanical intermitter 42 connected to the shaft of the sprocket 28. The drive of the conveyor 12 is such that at the end of each intermittant motion selected ones of the carriers 16 are located in positions to have armature cores removed therefrom or deposited thereon. For this purpose, each of the incoming load station, the winding stations, and the outgoing unload station are provided with transfer or part loader devices in the form of elevators. Thus, the incoming load station 18 is equipped with an incoming load elevator, generally designated 44, having a loader chuck 46 aligned with an opening in the carrier 16 located at the incoming load station 18 at the end of each of the step wise movements of the conveyor 12. At the end of any such step a loader chuck actuator 48, which may be a pneumatically operated cylinder, may be energized to cause the loader chuck 46 to be elevated toward an overhead loading clamp 50 into the position shown in FIG. 2 whereupon it can receive and unwound armature 14 which is then lowered so that the unwound armature is deposited on the carriers 16 at the incoming load station 18.

Each of the winding stations is also provided with transfer elevators, generally designated 52, which cooperate with overhead armature clamps 54 for transferring armatures to or from the armature winding machines 20. There is also an outgoing unload station elevator 56 operable to remove a wound armature core 22 from a carrier 16 at the outgoing unload station and deliver it to an unload armature receiving clamp 58. Here it should be observed that this invention is not directed to any particular form or construction of conveyor, except that it be an endless conveyor. Thus, the conveyor 12, as represented in FIG. 2, is intended to be illustrative of numerous conveyor assemblies and associated components that may be used for conveying workpieces from an incoming load station to plural work processing stations and from the work processing stations to an outgoing unload station. Further, it should be observed that the incoming load station and the outgoing unload station could be combined into a single station which could have either one or two elevators or transfer devices. The incoming load station and the outgoing unload station are shown separately because such will often be the case and for ease of description.

With continued reference to FIG. 2, the incoming load station elevator 44 has associated with it a sensor 60 that may comprise a limit switch. Similarly, the operations of the winding station elevators 52 are sensed by sensors 62 and a sensor 64 is associated with the outgoing unload station elevator 56. Each of the sensors 60, 62, and 64 is denoted an "elevator down sensor" in FIG. 1, because each is designed to indicate that the elevator with which it is associated has either been raised from or returned to its lowered position. Also diagrammatically illustrated in FIG. 1 is an index stop sensor 66 which signals that the conveyor 12 is at the end of one of its step-wise movements. To avoid improper operation, part sensors 68 are provided at each of the various load, unload, and work stations to detect the presence or absence of an armature at each such station. Part sensors 68 may comprise photocell assemblies as schematically illustrated in FIG. 1.

Referring to FIG. 1, the workpiece processing system 10 of this invention includes conveyor logic 70, such as may be provided by a microprocessor or other electrical control system. Conveyor logic 70 includes a conveyor seat memory 72, which may be a shift register or any other suitable memory device 72, that tracks each conveyor carrier 16 and designates each of the carrier seats as to its function at any given time. The use of shift registers or other memory devices for tracking and designating conveyor carriers is well known in the art as exemplified by Bornfleth et al. U.S. Pat. No. 3,726,383 and Mori et al. Japanese published application No. 59-081049. For example, the patent to Bornfleth et al. discloses an endless conveyor having hooks for carrying carriers past a plurality of stations. A closed loop shift register is provided, the shift register having one stage associated with each station. Each stage of the shift register stores an indication of the full/empty status of the hook at its station, this data being shifted to the next shift register stage as the hook moves to the next station. The data in a stage is modified if the status of the hook changes at any station.

In FIG. 1, the several sensors 60, 62, 64, 66, and 68 cause signals to be sent to the conveyor logic device 70. In return, the conveyor logic device 70 controls the operation of the conveyor drive motor 40, by selectively energizing a motor drive amplifier 74, and, in association with self contained control logic at each station, controls the operation of the incoming load station 18, the winding machines 20, and the outgoing unload station 24, along with the armature transfer devices or elevators associated with the several stations.

FIGS. 3 through 8 are flow charts disclosing the manner in which the logic controls the operations of the workpiece processing system 10. An important feature of the logic is that each of the carriers 16 is designated by the conveyor seat memory 72 as either (a) a work-to-be-performed carrier or (b) a work-finished carrier. In the case of an armature winding machine, a carrier for an unwound armature is designated as a work-to-be-performed carrier, and a carrier which may receive a wound armature is designated as a work-finished carrier. Assuming proper, undisturbed operation of all components of the system, an unwound armature or work-to-be-performed carrier will always be filled by an unwound armature. A carrier 16 filled by an unwound armature will be re-designated as a work-finished carrier at such time as the unwound armature is removed from the carrier at a winding station. The signal to initiate this change in carrier designation is created by the change in condition of the elevator down sensor 62 as soon as the elevator 52 associated therewith begins to rise in order to transfer the unwound armature to the winding machine. A carrier 16 designated as a work-finished carrier retains that designation whether or not it carries a wound armature to the outgoing unload station 24 until such time as an unwound armature is deposited thereon as determined by the conveyor logic in association with the incoming load station logic.

In accordance with this invention, a limitation is placed upon the number of carriers 16 filled at the incoming load station 18 with unwound armatures 14 by use of an algorithm by which there is a predetermined ratio between those of the carriers 16 being conveyed from the incoming load station 18 to the first of the armature winding machines 20 designated as work-to-be-performed or unwound armature carriers and those of the carriers designated as work-finished or wound armature carriers. Of the carriers 16 being conveyed from the incoming load station 18 to the first of the winders 20, there needs to be more carriers 16 designated as unwound armature carriers than those that are designated as wound armature carriers, so that unwound armatures will essentially always be available for supplying the winders 20. However, it is also necessary that there will be at least some carriers 16 designated in the memory 72 as wound armature carriers, because these will primarily be empty carriers which are needed so that freshly wound armatures 22 may be returned to the conveyor 12 from the winders 20 without undue delay. Accordingly, an algorithm is so selected that there are more of said carriers being conveyed from the load station 18 to the first of the winders 20 designated as work-to-be-performed or unwound armature carriers than those that are designated as work-finished or wound armature carriers.

Preferably, the algorithm is based upon the designations in the memory 72 of the carrier 16 at the load station 18 and of selected ones of the carriers 16 adjacent the load station 18 as either "work-to-be-performed" or "work-finished". As an example, one algorithm that has been used to advantage for an armature winding line employing four armature winding machines operates so that an unwound armature 14 is loaded into an empty carrier 16 at the incoming load station 18 when, and only when, the memory 72 designates at least one of the two carriers 16 that have just moved past the incoming load station 18 as a work-finished carrier and the carrier next approaching the incoming load station 18 as a work-finished carrier. Thus, the designation in memory of four immediately adjacent carriers 16, namely the carrier 16 at the load station 18, the two carriers 16 to the left of the load station 18 as viewed in FIGS. 1 and 2, and the carrier 16 to the right of the load station 18 are used in determining whether an unwound armature is to be placed in the carrier 16 at the load station.

By use of this algorithm, normally two out of every three carriers 16 being conveyed from the load station 18 to the first winder 20 are filled with an unwound armature and the other carriers are empty. This condition may not always apply because there may be circumstances in which wound armatures 22 may not be unloaded at the outgoing unload station 24 and will thereby be carried around to the incoming load station 18. This rarely occurs, and when it does, the presence of the wound armature in the carrier 16 at the incoming load station 18 will be sensed by the associated part sensor 68 so that an accidental attempt to load a second armature into the same carrier will be avoided.

Figure 3:
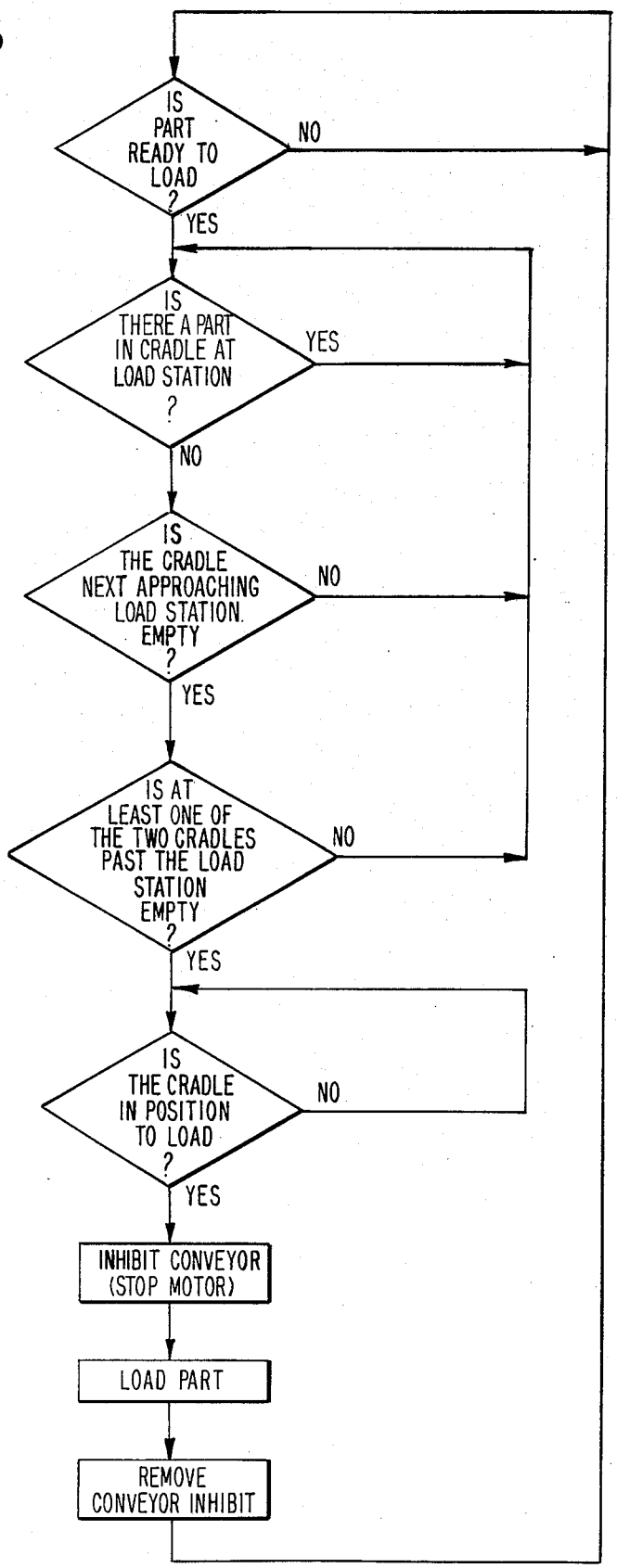
FIGS. 3, 4, 5, 6, 7 and 8 are flow diagrams illustrating the logic circuitry for various components of the processing system of FIG. 1.

FIG. 3 is a flow diagram in which the algorithm described above is used to determine whether or not an armature is to be loaded into a carrier 16 at the incoming load station 18. It should be noted in connection with FIGS. 3-8 that the term "empty" is used as a shorthand way of expressing that the memory 72 has designated the particular carrier as a work-finished carrier or cradle. Also it will be noted from FIG. 3 that logic operates to cause the conveyor motor 40 to be stopped at the end of the step which it is approaching if the conditions of the algorithm are met.

Figure 4:
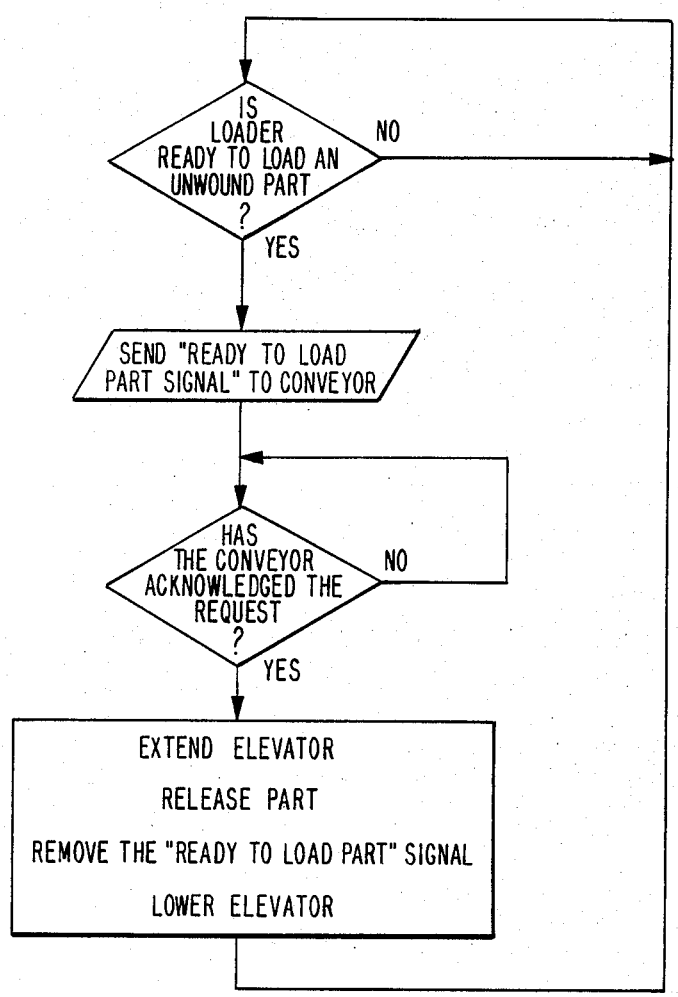

FIG. 4 is a flow chart for the loader functional logic which is believed self-explanatory to those familiar with the art. It can be seen by reference to FIGS. 3 and 4 that the conveyor will be stopped and a part deposited on the conveyor at the load station 18. When the elevator 44 returns to its lowered position, the conveyor motor 40 as shown in FIG. 3 will no longer be inhibited until such time as the loader is ready to load another unwound part onto the conveyor.

Figure 5:
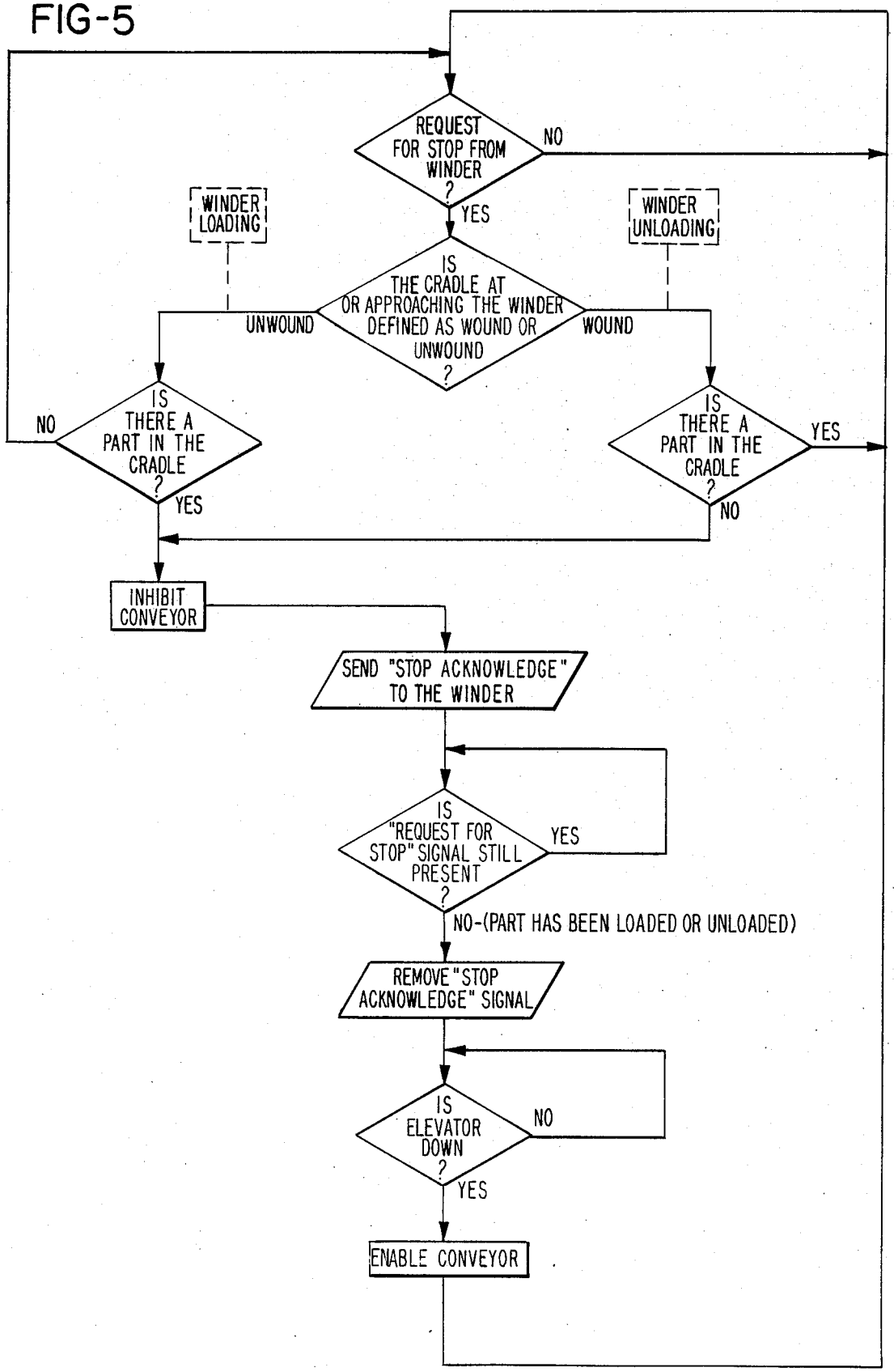

FIG. 5 is a flow chart of the functional logic used to handle a winder. Here again it may be noted that a cradle is referred to as being defined as "wound" or "unwound" which is a shorthand way of expressing the designation in memory of the carriers as being, respectively, either a work-finished carrier or a work-to-be-performed carrier. The effect of the designation as either wound or unwound, of course, creates a different result if the winder is loading or, on the other hand, unloading.

Figure 6:
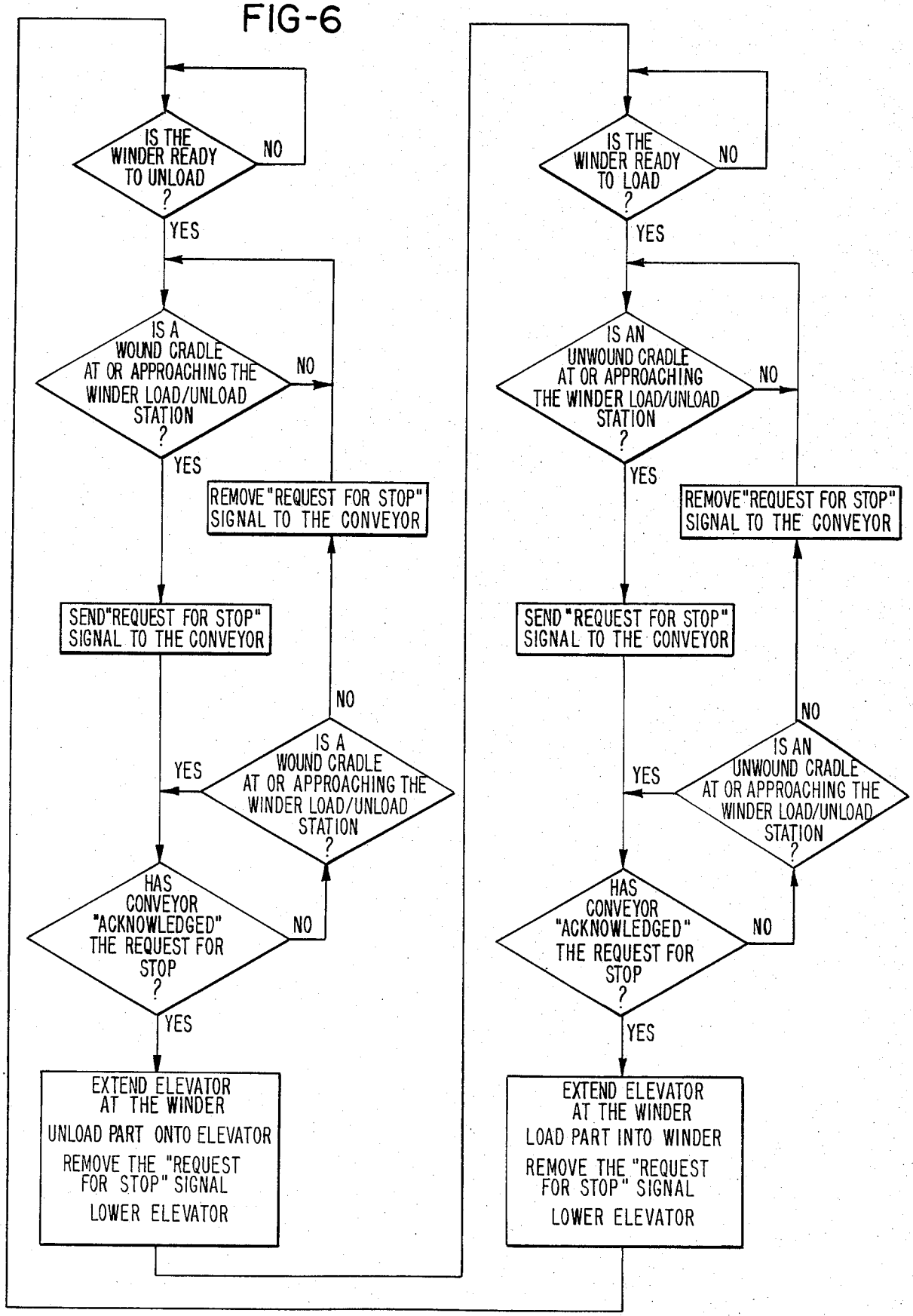

FIG. 6 comprises a flow chart of the winder functional logic with reference to the left side of FIG. 6 which relates to winder unloading. It may be noted that the question "Is a wound cradle at or approaching the winder load/unload station?" appears twice. The first time, if answered yes, a "request for stop" signal is sent to the conveyor, it is necessary to repeat this question in order to remove the "request for stop" signal in the event the wound cradle has moved past the winder load/unload station. A similar condition occurs for winder loading so that the same question is asked a second time in order to remove the "request for stop" signal if necessary.

Figure 7:
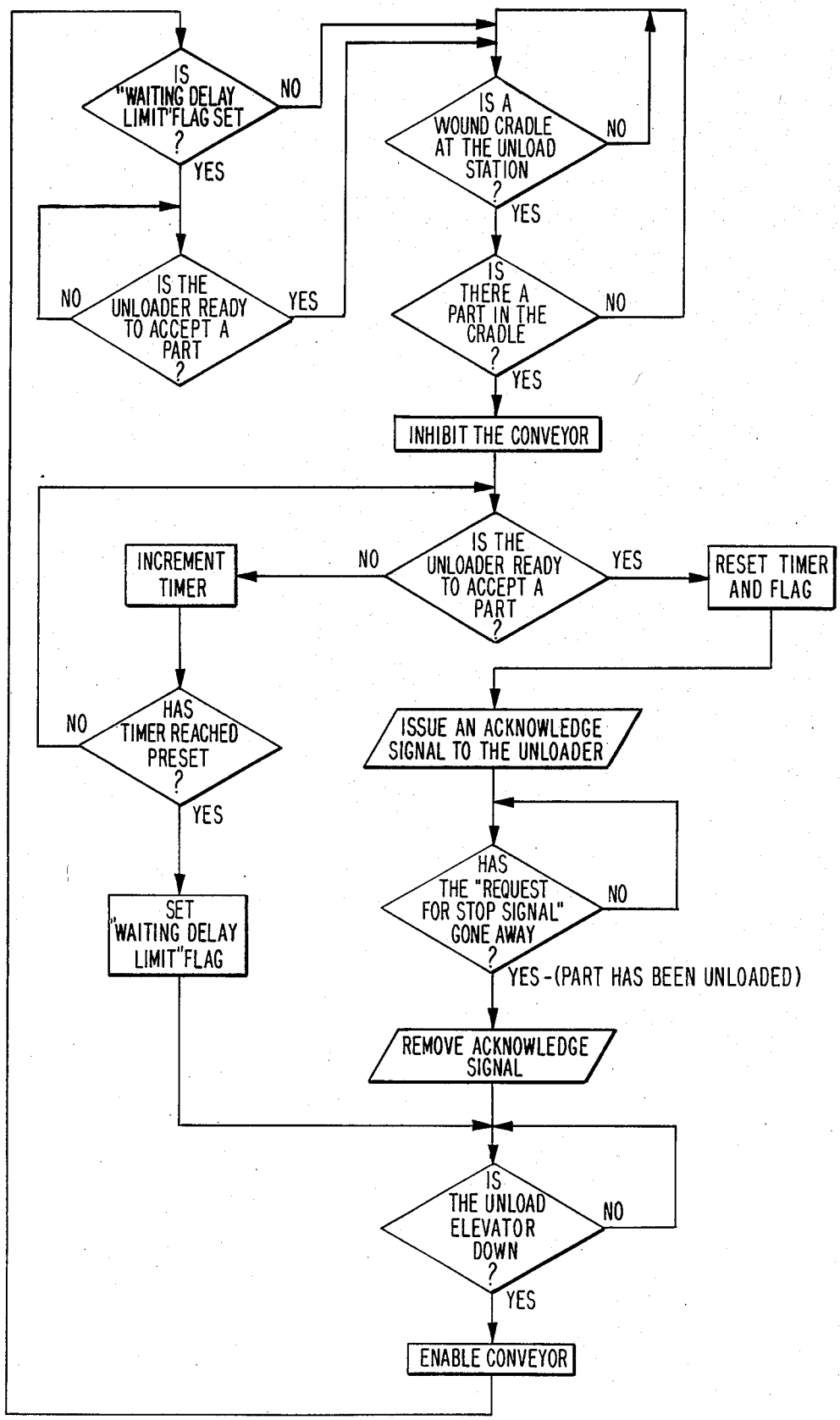

FIG. 7 is a flow chart for the conveyor unloading functional logic. The "'waiting delay limit' flag" referred to therein refers to a flag in the conveyor logic. In general, the conveyor unloading functional logic is designed to permit operation of the unload mechanism as soon as it is ready to accept a wound armature or other work-finished part. The purpose of the timer and the flag is to bypass the unload function after an interval of time if the unloader is not capable of receiving a wound part, so that the wound part will progress past the unload station and be temporarily stored on the conveyor.

Figure 8:
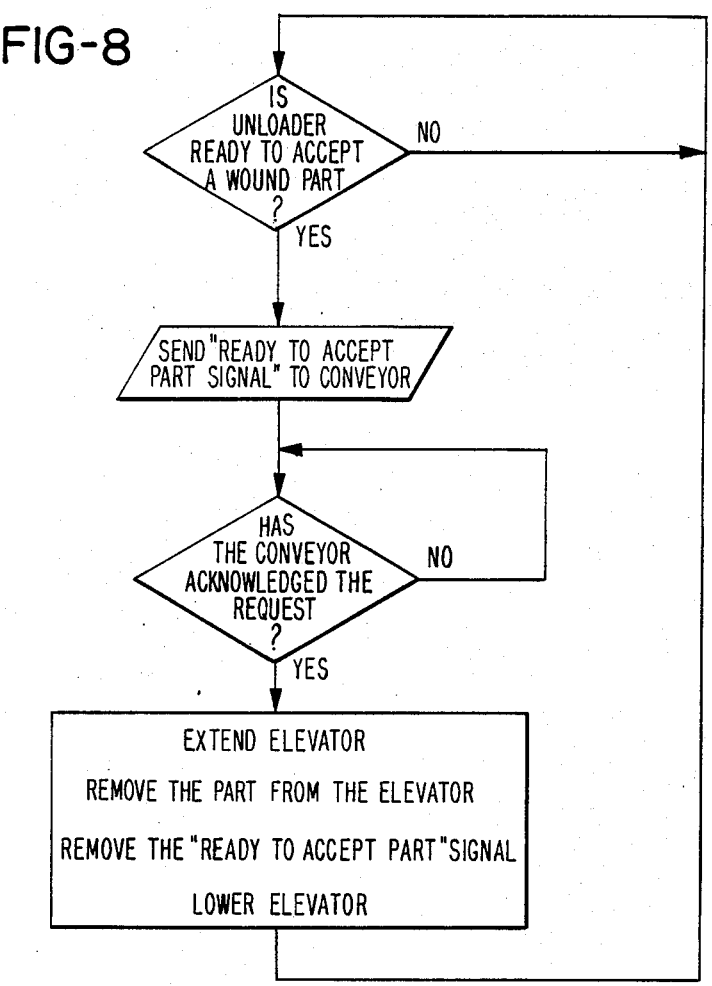

FIG. 8 is a flow chart for the outgoing unload station functional logic and requires no further description.

The conveyor 12 illustrated in FIGS. 1 and 2 is designed to progress indefinitely in step-wise fashion in a clockwise direction as viewed therein. Those skilled in the art will recognize that the invention may also be used with conveyors having the ability to reverse directions. Also, the conveyor carriers or seats 16 are designed to be filled by a single armature core, whereas there are circumstances when the carriers would be designed to carry two or more parts at a time for use with processing machines capable of processing more than one part at a time.

As to the logic, it is believed apparent that the particular algorithm used to control the operation of the incoming load station may be varied to suit the needs of the processing system. An algorithm may have to be selected by trial-and-error, but the selection process may often be assisted by computer simulation. Since processing machines in actual practice do not function with ideal, exactly predictable cycle times, the value of computer simulation is somewhat limited. In any case, it is expected that an algorithm based upon the condition in memory of the seats or carriers adjacent the incoming load station will be useful for maximizing production speeds.

Although the preferred embodiment is constructed to decide whether an unwound armature is to be loaded at the incoming load station 18 at the time that the carrier 16 to be loaded is at the incoming load station 18, those familiar with conveyor controls will appreciate that the decision can be made before such carrier 16 has reached the load station 18.

An enhancement of the logic described above which may be useful in some cases may be obtained by retaining the "empty" or "not empty" status of each carrier in memory. This information could be updated for each carrier each time it passes a part sensor 68. Such information could be used, for example, as a safety feature in the event someone manually adds or removes a workpiece from the conveyor. Also, in the event that processed workpieces are conveyed past the unload station, their carriers 16 could be identified in memory as work-finished but unusable or full carriers and the algorithm by which the load station operates could be appropriately modified to insure that a sufficient number of actually empty carriers 16 will be available to receive processed parts from the processing machines.

Although the presently preferred embodiment of this invention has been described, it will be understood that various changes may be made within the scope of the appended claims.

We claim:

1. Workpiece processing apparatus for performing processing operations on workpieces comprising:
   a plurality of processing machines, each respectively located at a processing station therefor;
   an incoming load station;
   an outgoing unload station;
   an endless conveyor having plural carriers for carrying the workpieces along an endless path passing adjacent said incoming load station, said processing stations and said outgoing unload station;
   plural machine load and unload transfer means, each located respectively adjacent each of said processing stations, for delivering workpieces from said carriers to receiving devices at said processing stations in preparation for having processing operations performed thereon and for returning workpieces after performance of the processing operations thereon to said carriers;
   said incoming load station having conveyor incoming load transfer means for transferring workpieces prepared to have processing operations performed thereon to said carriers;
   said outgoing unload station having conveyor outgoing unload transfer means for transferring workpieces upon which processing operations have been completed from said conveyor to said unload station;
   carrier seat memory means for tracking each of said carriers and designating each of said carriers as either (a) a work-to-be-performed carrier or (b) a work-finished carrier;
   means signaling said memory means to cause said memory means to designate each of said carriers as a work-to-be-performed carrier when it is filled at said incoming load station, said memory means retaining the work-to-be-performed designation of each of said carriers until it is emptied at a processing station;
   means signaling said memory means to cause said memory means to designate each of said carriers as a work-finished carrier when it is emptied at a processing station, said memory means retaining the work-finished designation of each of said carriers until it is filled at said incoming load station with at least one workpiece upon which work is to be performed;
   and incoming load logic means for controlling the operation of said incoming load transfer means to cause it to logically fill selected ones of said carriers with workpieces upon which work is to be performed so that the ratio between the number of those of said carriers being conveyed from said incoming load station to the first of said processing stations designated as work-to-be-performed carriers and the number of those of said carriers designated as work-finished carriers is finite and substantially constant.

2. The apparatus of claim 1 wherein said incoming load logic means comprises means responsive to the designations in said memory means of said carrier at said load station and of selected ones of said carriers adjacent said load station for controlling the operation of said incoming load transfer means.

3. The apparatus of claim 1 wherein said memory means tracks and designates each carrier as to whether it is filled or unfilled.

4. The apparatus of claim 1 wherein at least some of said machines operate in a manner to perform substantially identical processing operations on the workpieces.

5. The apparatus of claim 1 wherein said incoming load logic means comprises means for controlling the operation of said incoming load transfer means so that there are more of said carriers being conveyed from said incoming load station to the first of said processing stations designated as work-to-be-performed carriers than work-finished carriers.

6. The apparatus of claim 1 wherein said incoming load logic means controls the operation of said incoming load transfer means so that a workpiece upon which work is to be performed is loaded into an empty carrier at said incoming load station when, and only when, said memory means designates at least one of the last two carriers carried past said incoming load station as a work-finished carrier and a carrier next approaching said incoming load station as a work-finished carrier.

7. Apparatus as claimed in claim 1 and further comprising discriminator means including plural sensing means, each of said sensing means being located adjacent a respective one of said processing stations, for discriminating between empty work-finished carriers and work-finished carriers carrying a workpiece that has had said processing operations performed thereon, said discriminating means producing a signal enabling the machine load and unload transfer means at the respective station to return a workpiece only to an empty work-finished carrier.

8. Workpiece processing apparatus for performing processing operations on workpieces comprising:
- a plurality of processing machines, each respectively located at a processing station therefor;
- a load and unload station;
- an endless conveyor having plural carriers for carrying the workpieces along an endless path passing adjacent said load and unload station and said processing stations;
- plural machine load and unload transfer means, each located respectively adjacent each of said processing stations, for delivering workpieces from said carriers to receiving devices at said processing stations in preparation for having processing operations performed thereon and for returning workpieces after performance of the processing operations thereon to said carriers;
- said load and unload station having conveyor load transfer means for transferring workpieces prepared to have processing operations performed thereon to said carriers and for transferring workpieces upon which processing operations have been completed from said carriers;
- carrier seat memory means for tracking each of said carriers and designating each of said carriers as either (a) a work-to-be-performed carrier or (b) a work-finished carrier;
- means signaling said memory means to cause said memory means to designate each of said carriers as a work-to-be-performed carrier when it is filled at said load and unload station, said memory means retaining the work-to-be-performed designation of each of said carriers until it is emptied at a processing station;
- means signaling said memory means to cause said memory means to designate each of said carriers as a work-finished carrier when it is emptied at a processing station, said memory means retaining the work-finished designation of each of said carriers until it is filled at said load and unload station;
- and incoming load logic means for controlling the operation of said conveyor load transfer means to cause it to logically fill selected ones of said carriers with workpieces upon which work is to be performed so that the ratio between the number of those of said carriers being conveyed from said load and unload station to the first of said processing stations designated as work-to-be-performed carriers and the number of those of said carriers designated as work-finished carriers is finite and substantially constant.

9. The apparatus of claim 8 wherein said incoming load logic means comprises means responsive to the designations in said memory means of said carrier at said load and unload station and of selected ones of said carriers adjacent said load and unload station for controlling the operation of said load transfer means at said load and unload station.

10. The apparatus of claim 8 wherein said memory means tracks and designates each carrier as to whether it is filled or unfilled.

11. The apparatus of claim 8 wherein at least some of said machines operate in a manner to perform substantially identical processing operations on the workpieces.

12. The apparatus of claim 8 wherein said incoming load logic means comprises means for controlling the operation of said load transfer means at said load and unload station so that there are more of said carriers being conveyed from said load and unload station to the first of said processing stations designated as work-to-be-performed carriers than work-finished carriers.

13. The apparatus of claim 8 wherein said incoming load logic means controls the operation of said load transfer means at said load and unload station so that a workpiece upon which work is to be performed is loaded into an empty carrier at said load and unload station when, and only when, said memory means designates at least one of the last two carriers carried past said load and unload station as a work-finished carrier and a carrier next approaching said load and unload station as a work-finished carrier.

14. Apparatus as claimed in claim 8 and further comprising discriminator means including plural sensing means, each of said sensing means being located adjacent a respective one of said processing stations, for discriminating between empty work-finished carriers and work-finished carriers carrying a workpiece that has had said processing operations performed thereon, said discriminating means producing a signal enabling the machine load and unload transfer means at the respective station to return a workpiece only to an empty work-finished carrier.

15. A method of conveying workpieces from an incoming load station to a plurality of processing machines, each respectively located at a processing station therefor, utilizing an endless conveyor having plural carriers for carrying the workpieces along an endless path passing adjacent said incoming load station and said processing stations, the steps of said method comprising:
- providing carrier seat memory means for tracking each of said carriers and designating each of said carriers as either (a) a work-to-be-performed carrier or (b) a work-finished carrier;
- signaling said memory means to cause said memory means to designate each of said carriers as a work-to-be-performed carrier when it is filled at said incoming load station;
- selectively transferring workpieces from work-to-be-performed carriers to said processing machines;
- signaling said memory means to cause said memory means to designate each of said carriers as a work-finished carrier when it is emptied at a processing station;
- selectively transferring workpieces from said processing machines to work-finished carriers;
- continuing to designate a carrier as a work-finished carrier in said memory means until the carrier is again designated a work-to-be-performed carrier when it is again filled at said incoming load station;
- and logically filling selected ones of said carriers when at said incoming load station with workpieces upon which work is to be performed so that the ratio between the number of those of said carriers being conveyed from said incoming load station to the first of said processing stations designated as work-to-be-performed carriers and the number of those of said carriers designated as work-finished carriers is finite and substantially constant.

16. The method of claim 15 wherein the filling of said carriers is determined by the designations in said memory means of said carrier at said load station and of selected ones of said carriers adjacent said load station.

17. The method of claim 15 comprising the further step of signaling said memory means as to whether said carriers are filled or unfilled.

18. The method of claim 15 wherein the filling of said carriers is such that of said carriers being conveyed from said incoming load station to the first of said processing stations, more carriers are designated as work-to-be-performed carriers than work-finished carriers.

19. The method of claim 15 wherein the filling of said carriers is such that a workpiece upon which work is to be performed is loaded into an empty carrier at said incoming load station when, and only when, said memory means designates at least one of the last two carriers conveyed past said incoming load station as a work-finished carrier and a carrier next approaching said incoming load station as a work-finished carrier.

20. The method as claimed in claim 19 wherein the step of selectively transferring workpieces from said processing machines to work-finished carriers comprises sensing said carriers for the presence of a workpiece and transferring a workpiece from a processing machine to a work-finished carrier only when it is sensed that the carrier is empty.

* * * * *

UNITED STATES PATENT AND TRADEMARK OFFICE
CERTIFICATE OF CORRECTION

PATENT NO. : 4,982,827

DATED : January 8, 1991

INVENTOR(S) : David R. Seitz et al.

It is certified that error appears in the above-identified patent and that said Letters Patent is hereby corrected as shown below:

On title page, item [56], U.S. PATENT DOCUMENTS: "3,549,644" should read --4,549,644--.

Signed and Sealed this

Twentieth Day of April, 1993

Attest:

MICHAEL K. KIRK

Attesting Officer      Acting Commissioner of Patents and Trademarks